(12) United States Patent
Vanderipe

(10) Patent No.: US 6,523,335 B2
(45) Date of Patent: Feb. 25, 2003

(54) LAWN MOWER ROLLER HAVING A UNIVERSAL MOUNT FOR MOUNTING GRASS BENDING ROLLER

(76) Inventor: Richard F. Vanderipe, 1514 StoneRipple Cir., Lafayette, IN (US) 47909

( * ) Notice: Subject to any disclaimer, the term of this patent is extended or adjusted under 35 U.S.C. 154(b) by 0 days.

(21) Appl. No.: 09/841,203

(22) Filed: Apr. 24, 2001

(65) Prior Publication Data

US 2002/0152734 A1 Oct. 24, 2002

(51) Int. Cl.[7] .................. A01D 34/03; A01D 34/43; A01D 34/64
(52) U.S. Cl. .................. 56/16.7; 56/17.4
(58) Field of Search .................. 56/16.7, 16.9, 56/249, 2, 294, 17.4, 255, 320.1, 320.2, DIG. 24; 404/122, 131

(56) References Cited

U.S. PATENT DOCUMENTS

| | | | | |
|---|---|---|---|---|
| 2,032,784 A | * | 3/1936 | Worthington | 56/7 |
| 2,260,801 A | * | 10/1941 | Clemson | 56/249 |
| 2,329,383 A | * | 9/1943 | Bly | 56/252 |
| 2,660,018 A | * | 11/1953 | Clemson | 56/249 |
| 2,667,026 A | * | 1/1954 | Ingram | 56/249 |
| 2,954,836 A | * | 10/1960 | Cavanaugh | 180/343 |
| 3,260,042 A | * | 7/1966 | Hanson et al. | 56/249 |
| 3,402,535 A | * | 9/1968 | Nelson | 56/320.1 |
| 3,555,793 A | * | 1/1971 | Chapman | 56/17.4 |
| 4,208,151 A | | 6/1980 | Cross | |
| 4,455,816 A | * | 6/1984 | Porath | 56/249 |
| 4,481,757 A | | 11/1984 | Tsuchiya | |
| 4,638,622 A | | 1/1987 | Smith | |
| 4,749,305 A | | 6/1988 | Brown et al. | |
| 5,261,213 A | | 11/1993 | Humphrey | |
| 5,553,380 A | * | 9/1996 | Rice | 29/895.2 |
| 5,870,888 A | | 2/1999 | Pugh | |
| 6,047,530 A | * | 4/2000 | Bednar | 56/6 |

* cited by examiner

Primary Examiner—Thomas B. Will
Assistant Examiner—Árpád Fábián Kovács
(74) Attorney, Agent, or Firm—Woodard, Emhardt, Naughton, Moriarty & McNett LLP

(57) ABSTRACT

A lawn mower roller for bending lawn grass in a striped pattern. A roller is rotatably mounted to a universal mount pivotally mounted to the lawn mower housing or frame. A pair of arms have proximal ends slidably adjustable to receive the lawn mower housing therebetween and have distal ends pivotally mounted to the lawn mower housing.

6 Claims, 2 Drawing Sheets

US 6,523,335 B2

LAWN MOWER ROLLER HAVING A UNIVERSAL MOUNT FOR MOUNTING GRASS BENDING ROLLER

BACKGROUND OF THE INVENTION

The present invention relates generally to the field of rollers movable across a grassy lawn.

DESCRIPTION OF THE PRIOR ART

A variety of rollers have been devised for moving across the ground to flatten dirt and obstacles. When a roller is pulled across a grassy lawn, the grass is caused to assume a bent condition and thus, when the roller is pulled in a first direction and then in a second reverse direction, an aesthetic pleasing striped pattern is provided by rows of grass being bent in opposite directions. Typically, lawn care professionals utilize rollers to provide this cosmetic appearance. The rollers are fixedly mounted to relatively large and heavy lawn cutting devices.

A number of U.S. patents have been granted on lawn roller or compacting devices. For example, U.S. Pat. No. 4,749,305 issued to Brown discloses an earth compactor drum whereas U.S. Pat. No. 4,208,151 issued to Cross discloses a motorized device designed solely for rotating and moving a heavy drum across the lawn. U.S. Pat. No. 4,481,757 issued to Tsuchiya discloses a powered lawn mower having a roller mounted in front of the mower to condition the grass prior to being engaging by the mower blades. A riding type mower designed to mow greens on golf courses and having a roller affixed thereto is disclosed in U.S. Pat. No. 5,261,213 issued to Humphrey. U.S. Pat. No. 4,638,622 issued to Smith and U.S. Pat. No. 5,870,888 issued to Pugh disclose rollers mounted rearwardly to the lawn mower housing.

The prior lawn rollers are characterized in that the roller is designed to fit a specific vehicle or lawn mower and is not readily adaptable to a variety of different sizes of lawn mowers. Most lawns are cut by homeowners who own a variety of different types, shapes and sizes of lawn mowers. What is needed is a roller having a universal mount that may be easily secured and adapted to mount to the variety of different types of lawn mowers. Disclosed herein is a universal mount having a roller attached thereto that includes adjustable means to secure the roller to the lawn mower.

In order to ensure uniform rolling of the grass, it is desirable to limit bouncing of the roller relative to the ground as the roller is pulled across the lawn by the lawn mower. Thus, the universal mount disclosed herein is designed to limit bouncing with the roller moving vertically relative to the ground only when the universal mount arms pivot on the lawn mower housing.

SUMMARY OF THE INVENTION

One embodiment of the present invention is the combination of a lawn mower having a frame portion with opposite sides and a roller having a cylindrical main body with opposite ends and sufficient weight to bend grass downwardly to a bent condition after the roller is moved thereacross. A universal mount has a pair of opposed roller mounts rotatably securing the roller thereto. The universal mount further has two forwardly extending arms attached to the opposite sides of the frame portion positioning the roller behind the lawn mower. Fasteners adjustably mounted to the mounts secure the arms in position limiting relative motion between the arms once the arms have been spaced apart on the universal mount to locate the frame portion therebetween.

It is an object of the present invention to provide a universal mount for a lawn roller that is adjustable to mount the roller to a variety of shapes and sizes of lawn mowers.

A further object of the present invention is to provide a lawn mower having a roller mounted thereto that may be easily removed and remounted to a different lawn mower.

A further object of the present invention is to provide a lawn mower roller mounted to the lawn mower in such a manner to limit vertical bouncing of the roller.

Related objects and advantages of the present invention will be apparent from the following description.

DESCRIPTION OF THE PREFERRED EMBODIMENT

Figure 1:
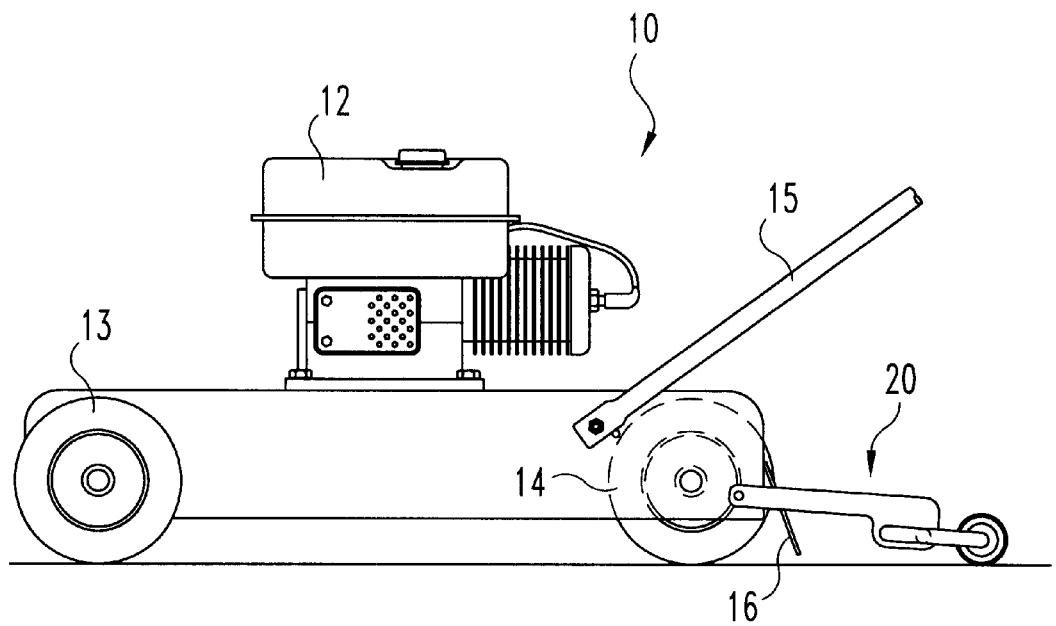
FIG. 1 is a side view of a lawn mower incorporating the roller of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is shown a lawn mower 10 of conventional design having a main frame or housing 11 with an internal combustion engine 12 mounted there atop and connected to a rotary blade located within and below housing 11. A front pair of wheels 13 and a rear pair of wheels 14 are rotatably mounted to the lawn mower housing which has a rearwardly extending handle 15 secured thereto. Lawn mower 10 is of the non-riding type and is designed to be self-propelled with the user walking behind the lawn mower and holding onto handle 15. A safety flap 16 has its top end pivotally mounted to housing 11 to prevent cut grass, stones and other debris from flying rearwardly towards the operator.

Figure 2:
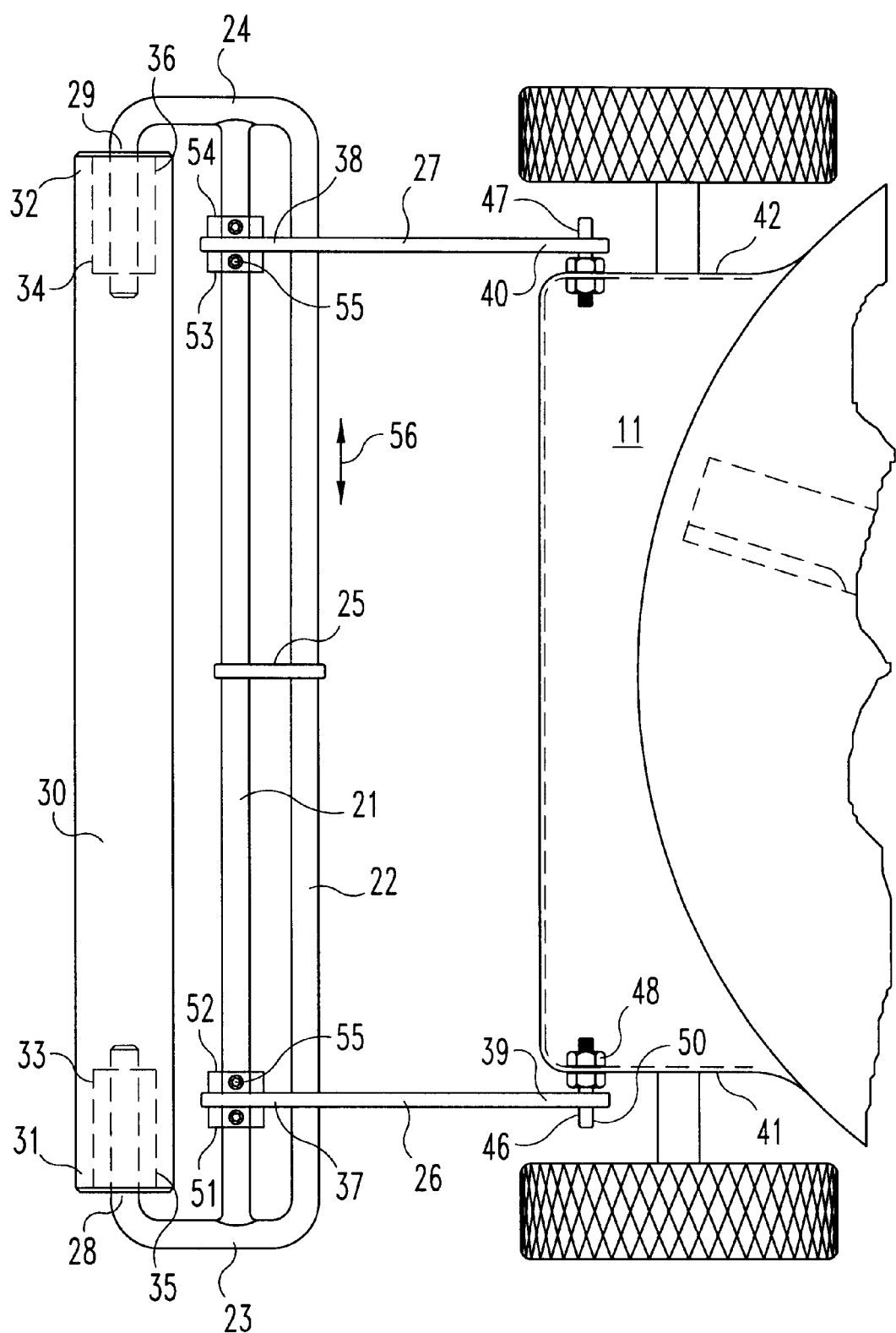
FIG. 2 is a fragmentary top view of the roller and universal mount attached to the lawn mower main frame.

A universal mount with roller 20 is pivotally mounted to housing 11 and extends rearwardly thereof to force the grass into a bent condition as the lawn mower is moved across the lawn. The universal mount with roller includes a pair of parallel rods 21 and 22 (FIG. 2) having their opposite ends fixedly joined to end plates 23 and 24 by welding or other suitable means. End plates 23 and 24 may also have a round configuration in lieu of a flat plate configuration. An intermediate plate or member 25 is located equidistant between a pair of forwardly extending arms 26 and 27 with member 25 being joined to rods 21 and 22 by welding or other suitable means.

A pair of inwardly extending and mutually opposed fingers 28 and 29 have their proximal ends fixedly secured to end plates 23 and 24 and distal ends which extend into and rotatably mount a cylindrical roller 30.

Roller 30 has sufficient weight to cause the grass to bend and assume a bent condition thereafter once the roller is moved across the grassy lawn. In one embodiment, roller 30 has an outside diameter of 1¾ inches and weighs 12 lbs. The opposite ends 31 and 32 of roller 30 have cavities 33 and 34 into which fingers 28 and 29 extend. A pair of bearings 35 and 36 are located in cavities 33 and 34 and rotatably receive fingers 28 and 29. Bearings 35 and 36 are commercially available and may consist of a nylon sleeve having an outside diameter of ¾ inch, an inside diameter of ½ inch, and a length of 1inch. The nylon sleeves or bearings 35 and 36 are provided in counter bore cavities of cavities 33 and 34.

Figure 3:
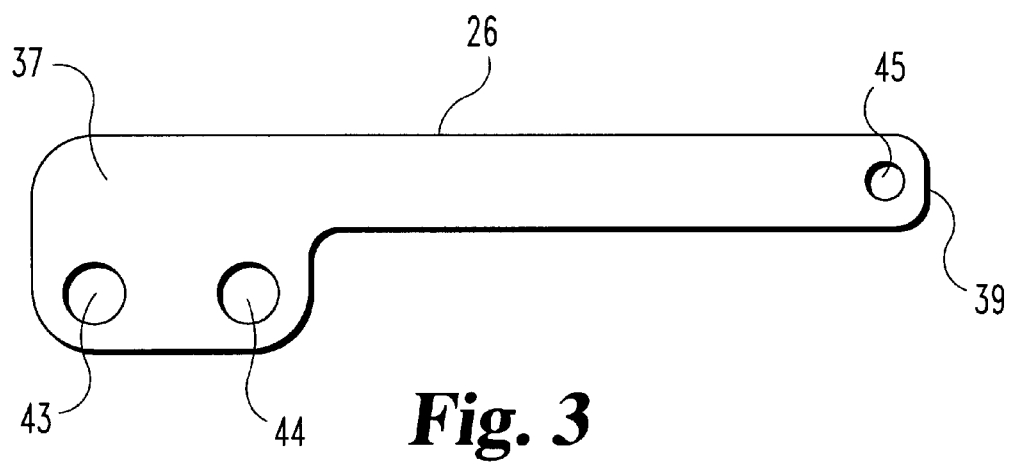
FIG. 3 is a side view of one of the roller mounting arms.

Arms 26 and 27 have proximal ends 37 and 38 mounted to rods 21 and 22 and distal ends 39 and 40 pivotally mounted to the opposite side walls 41 and 42 of housing or frame portion 11. Arms 26 and 27 are identical and thus, the following description of arm 26 applies equally to arm 27. Arm 26 is of flat plate construction having a pair of mounting holes 43 and 44 (FIG. 3) provided in the proximal end 37 of the arm. Further, a third hole 45 is provided in the distal end 39 of the arm. Rods 21 and 22 slide freely through respectively holes 43 and 44 of the arm and identical holes provided in arm 27. Both arms are mounted to rods 21 and 22 prior to end plates 23 and 24 being secured to the rods. The distal ends 39 and 40 of plates 26 and 27 are mounted to the opposite side walls 41 and 42 of the lawn mower housing 11 by means of conventional fastening devices 46 and 47 extending through the hole provided in each distal end of each arm. For example, fastening device 46 extends through hole 45 of arm 26.

The fastening devices 46 and 47 may consist of a cantileveredly mounted pin having a proximal end 48 fixedly mounted to the side wall of the lawn mower housing by nuts with the distal end 50 projecting outwardly thereof to allow plate 26 to be mounted thereon by extending distal end 50 through hole 45.

Four collars are mounted to rod 21 to position and secure arms 26 and 27 to the rod. Thus, collars 51 and 52 are provided with cylindrical holes being aligned with hole 43 of arm 26 with rod 21 then extending through the holes in collars 51 and 52 and with arm 26 being located between collars 51 and 52. Likewise, a second pair of collars 53 and 54 are mounted to rod 21 on either side of arm 27 in a manner similar to the mounting for arm 26. Each collar is provided with a set screw 55 that may be tightened to secure the collar on the rod.

In order to mount the universal mount and roller 20 to a particular lawn mower, set screws 55 are loosened to enable arms 26 and 27 to be moved longitudinally along the length of rods 21 and 22 thereby allowing the arms to be positioned on either side of the lawn mower housing 11. The distal ends 39 and 40 of arms 26 and 27 are mounted to pins 46 and 47. Once the arms are mounted to pins 46 and 47, rods 21 and 22 along with roller 30 are moved in the longitudinal direction of double headed arrow 56 until intermediate member 25 is located equidistant between arms 26 and 27 thereby locating roller 30 centrally with respect to the lawn mower. Collars 51 and 52 are then moved along rod 21 until located immediately adjacent and in contact with arm 26 with set screws 55 then being tightened to limit relative motion between arm 26 and rods 21 and 22 along with roller 30. Similarly, collars 53 and 54 are moved along the length of rod 21 until positioned immediately adjacent and in contact with arm 27 with set screws 55 then being tightened to limit relative motion between arm 27 and rods 21 and 22 along with roller 30.

The roller shown in the drawings is a lawn striper for attaching to the main housing of the lawn mower for bending a row of grass in a forward direction as the lawn mower is moved across the grass in the forward direction. The lawn mower may then be turned around and moved in a reverse direction in an adjacent row of grass thereby bending the grass in the adjacent row in an opposite direction providing a striped grass pattern on the lawn. The device is particularly adaptable to different configurations and sizes of lawn mowers in that the mounting arms 26 and 27 may be adjusted apart to receive the particular size of lawn mower housing therebetween.

The universal mount is designed so that rods 21 and 22 are parallel to the roller and are mounted to the proximal ends of arms 26 and 27 to pivot as a unit as the distal ends of the arms pivot relative to the lawn mower thereby reducing the amount of vertical bounce or movement of the roller as compared to a frame wherein arms 26 and 27 are both pivotally mounted to the lawn mower housing and also pivotally mounted to rod 21. By extending a second rod 22 through arms 26 and 27 along with rod 21, the universal mount is provided with rigidity ensuring a more uniform force being applied to the grass as the lawn mower is moved thereacross. The roller will pivot relative to the lawn mower housing only when the distal ends 39 and 40 of arms 26 and 27 pivot.

The roller must have sufficient weight to bend the grass downward with the grass assuming a bent condition after the lawn mower has passed thereacross. I have found that utilizing a roller having a weight of 12 lbs. is of sufficient weight to provide this bending action. Further, the roller should have a length equal to the approximate width of the lawn mower or the distance between the outside edge of one rear wheel to the other rear wheel.

The height of the roller and the universal mount is automatically set by setting the cutting height of the lawn mower since arms 26 and 27 are pivotally mounted to the lawn mower housing. Thus, the complex structures utilized in many of the prior rollers is avoided. The roller is designed to be mounted to a non-riding mower of the self-propelled variety.

It will be apparent from the above-description that the present invention has many advantages as compared to the prior lawn rollers. First and foremost is the ability to mount the roller to a variety of different sized and configured lawn mowers without the necessity for complex structures. In addition, exceptionally heavy roller mechanisms and springs are not required. Likewise, the roller and universal mount are designed to minimize vertical bounce of the roller.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A lawn stripper for attaching to a lawn mower having a main housing for bending grass in a forward direction when moved across a lawn in a forward direction and then bending grass in an opposite direction when moved thereacross in an opposite direction leaving a stripped pattern in the lawn comprising:

a roller with a cylindrical main body having weight to cause grass to bend and assume a bent condition thereafter after the roller is moved across the lawn, said cylindrical main body having opposite ends; and, a universal mount for mounting said roller to the main housing of the lawn mower, said mount including a mount main body with a first pair of arms extending inwardly to and rotatably receiving said opposite ends of said cylindrical main body, said mount main body having a second pair of arms having distal ends attachable to said housing and proximal ends secured to said mount main body being adjustable to space said distal ends apart to receive said housing of the lawn mower therebetween; and wherein:

said mount main body has a first rod extending parallel to said roller and further extending through said proximal ends of said second pair of arms, said mount main body having collars slidably mounted to said first rod and movable along the length thereof to positions on either side of and adjacent each of said proximal ends, said collars have fasteners to adjustably secure said collars in place limiting relative motion between said collars and said second pair of arms relative to said first rod once said second pair of arms have been spaced apart to receive said housing therebetween.

2. The lawn stripper of claim 1 wherein:

said mount main body has a second rod extending parallel to said first rod and further extending through said second pair of arms, said first rod and said second rod are spaced apart but fixed together limiting relative motion therebetween with said first rod and said second rod secured to said roller and said second arms requiring said roller to pivot relative to said housing only when said second arms pivot said mount main body.

3. The lawn stripper of claim 2 wherein said mount main body has an intermediate portion located equidistant between said second arms contacting and fixedly securing said first rod and said second rod together limiting relative motion therebetween and wherein two of said collars are located adjacent one of said second arms located therebetween and two of said collars are located adjacent the other of said second arms located therebetween.

4. The combination of:

a lawn mower having a frame portion with opposite sides;

a roller having a cylindrical main body with opposite ends and weight to bend grass downwardly to a bent condition after the roller is moved thereacross; and, a universal mount having a pair of opposed roller mounts rotatably securing said roller thereto, said universal mount further having two forwardly extending arms attached to said opposite sides of said frame portion positioning said roller behind said lawn mower, said universal mount further having fasteners adjustably mounted thereto securing said arms in position limiting relative motion between said arms once said arms have been spaced apart on said universal mount to locate said frame portion therebetween; and wherein:

said universal mount positioning said roller rearwardly of said lawn mower;

said arms are pivotally mounted to said frame portion, said universal mount including a pair of rods fixedly secured together and extending parallel to said roller and with said two arms fixedly secured to said rods limiting movement between said arms and either of said rods requiring said rods and roller to pivot together as a unit as said arms pivot relative to said frame portion and said roller is moved across the ground.

5. The combination of claim 4 wherein:

said fasteners include two pairs of collars adjustably mounted to one of said rods on either side of each of said arms fixing said arms in place on said roller mounts once said arms are spaced apart with said frame portion located therebetween.

6. The combination of:

a lawn mower having a frame portion with opposite sides;

a roller having a cylindrical main body with opposite ends and weight to bend grass downwardly to a bent condition after the roller is moved thereacross; and, a universal mount having a first rod and a second rod secured together with said first rod and said second rod extending parallel to said roller, said mount further having a pair of inwardly projecting and mutually opposed fingers rotatably securing said roller to said mount, said universal mount further having a first forwardly extending arm and a second forwardly extending arm attached to said opposite sides of said frame portion positioning said roller behind said lawn mower, said universal mount further having a first pair of spaced apart collars adjustably mounted to said second rod with said first arm located between said first pair of collars and further having a second pair of spaced apart collars adjustably mounted to said second rod with said second arm located between said second pair of collars with said first pair of collars and said second pair of collars securing said first arm and said second arm in position limiting relative motion between said first arm and said second arm once spaced apart on said second rod with said frame portion therebetween, said first arm and said second arm are pivotally mounted to said frame portion but secured to said first rod and said second rod so said universal mount with roller to pivot together as a unit as said first arm and said second arm pivot relative to said frame portion and said roller is moved across the ground.

* * * * *